R. KLEIN & T. M. BRUECK.
PHOTOGRAPHIC SHUTTER.
APPLICATION FILED DEC. 18, 1916.
1,276,663.
Patented Aug. 20, 1918.
3 SHEETS—SHEET 1.
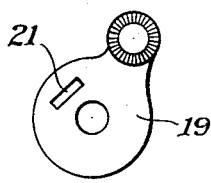
Fig. 9.
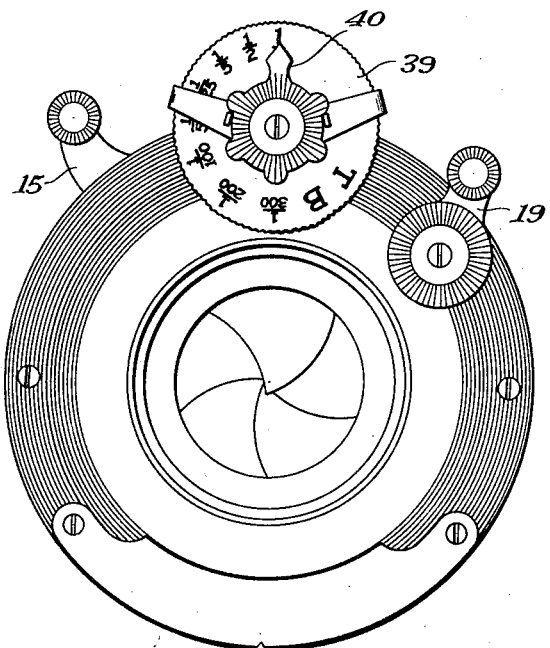
Fig. 1.
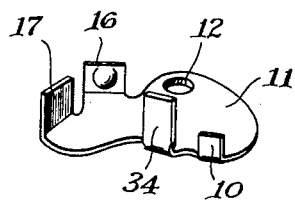
Fig. 10.
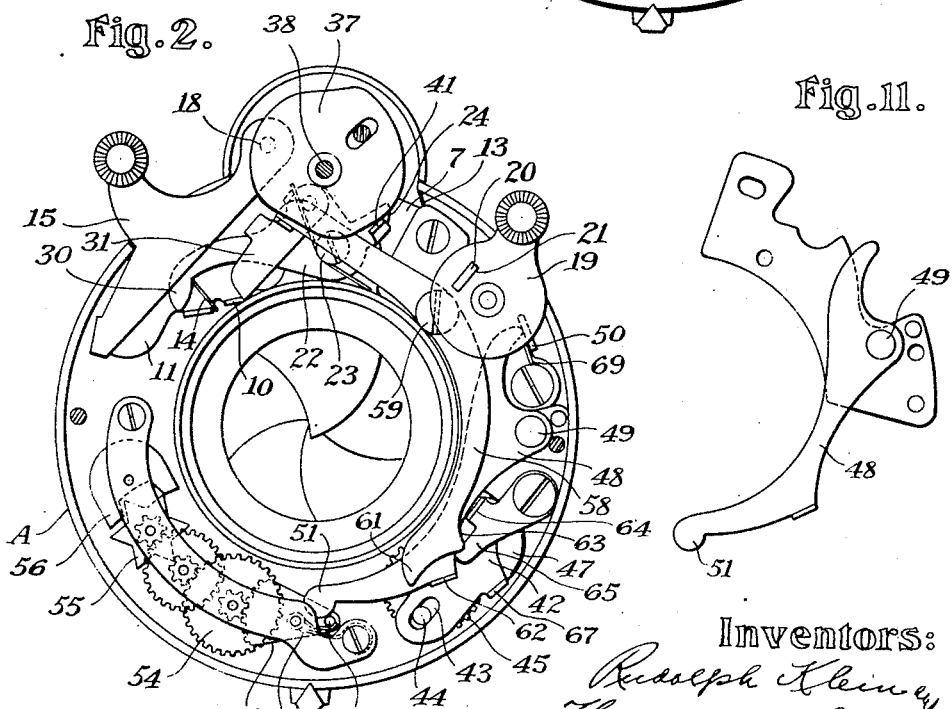
Fig. 2.
Fig. 11.
Inventors:
Rudolph Klein
Theodor M. Brueck
by Davis & Simms
their attorneys R. KLEIN & T. M. BRUECK.
PHOTOGRAPHIC SHUTTER.
APPLICATION FILED DEC. 18, 1916.
1,276,663.
Patented Aug. 20, 1918.
3 SHEETS—SHEET 2.
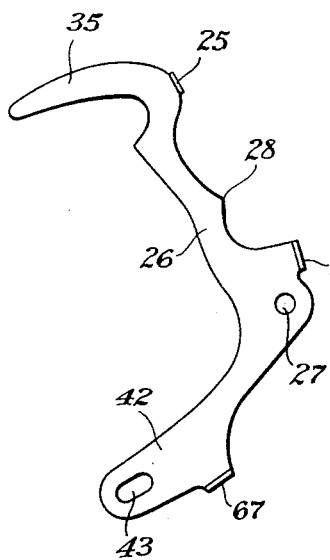
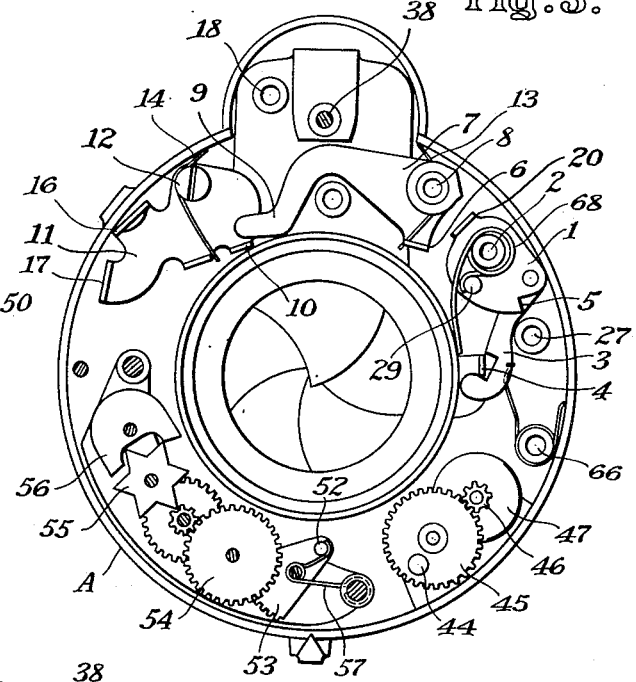
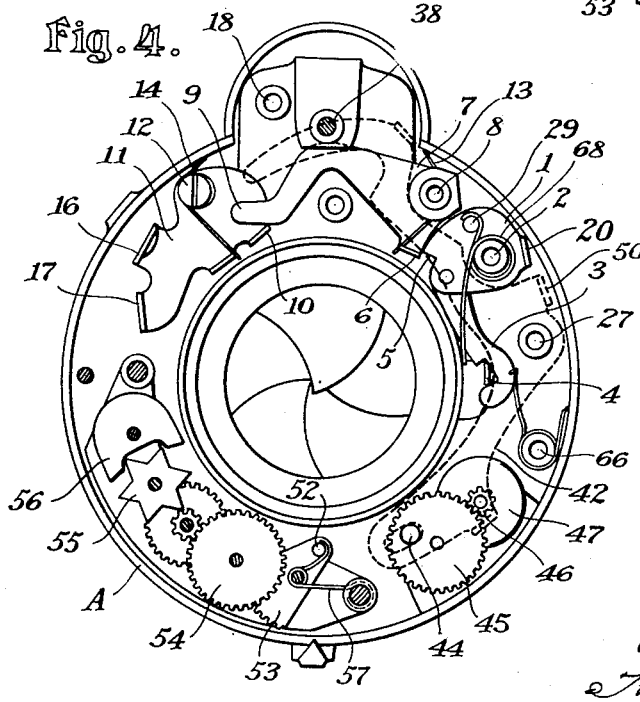
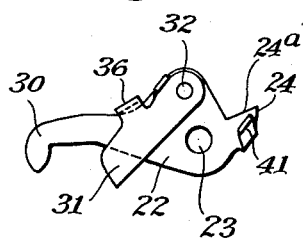
Inventors:
Rudolph Klein
Theodor M. Brueck
by Davis & Simms
their attorneys

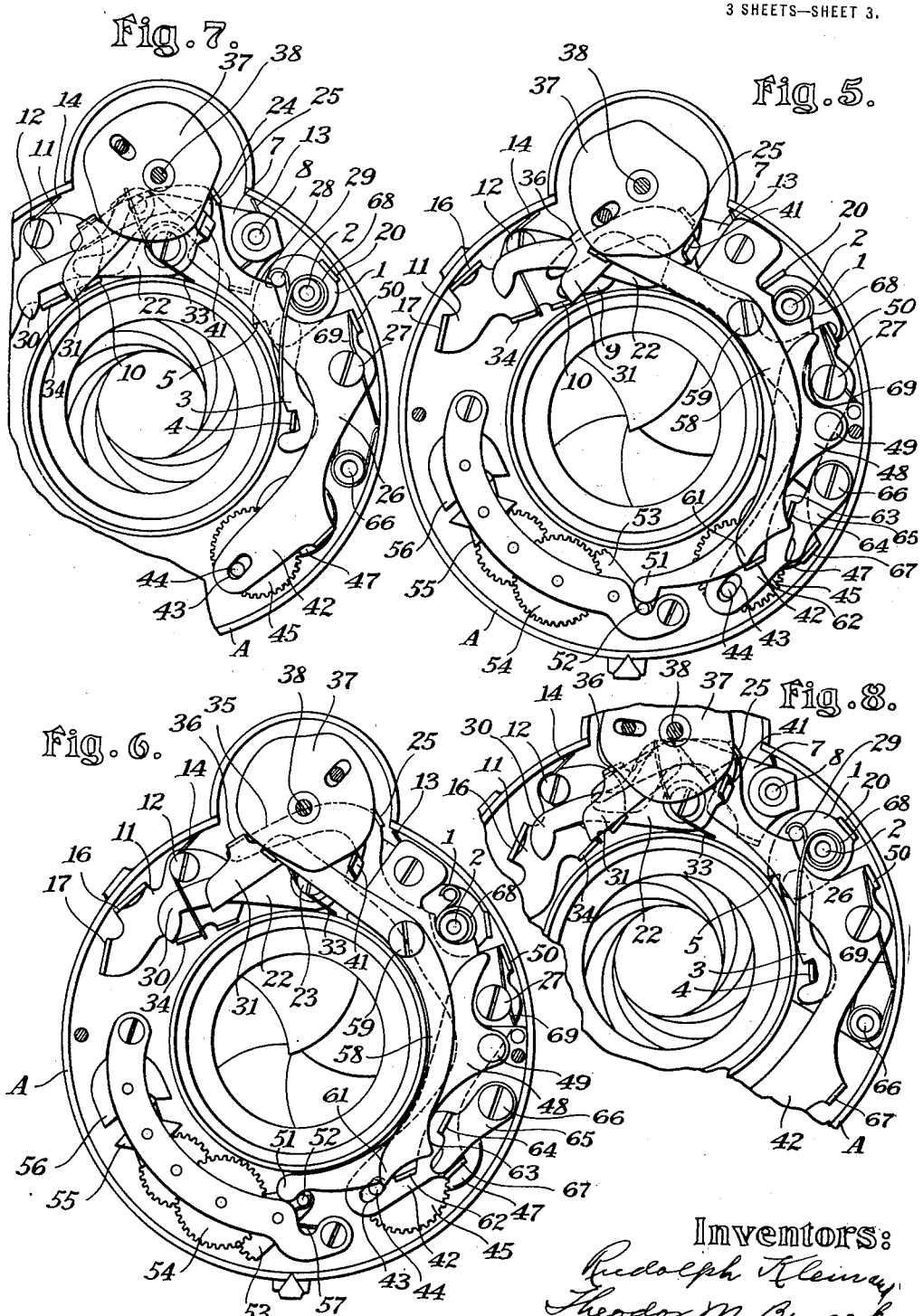

UNITED STATES PATENT OFFICE.

RUDOLPH KLEIN AND THEODOR M. BRUECK, OF ROCHESTER, NEW YORK, ASSIGNORS TO ILEX OPTICAL COMPANY, OF ROCHESTER, NEW YORK, A CORPORATION.

PHOTOGRAPHIC SHUTTER.

1,276,663.     Specification of Letters Patent.     Patented Aug. 20, 1918.

Application filed December 18, 1916. Serial No. 137,557.

*To all whom it may concern:*

Be it known that we, RUDOLPH KLEIN and THEODOR M. BRUECK, citizens of the United States, and residents of Rochester, in the county of Monroe and State of New York, have invented certain new and useful Improvements in Photographic Shutters, of which the following is a specification.

The present invention relates to photographic shutters and an object thereof is to construct a shutter which will be more positive in its action. Another object of the invention is to provide an improved retarding mechanism which will be more accurate in its operation and at the same time more durable in use.

To these and other ends, the invention consists of certain parts and combinations of parts all of which will be hereinafter described, the novel features being pointed out in the appended claims.

In the drawings:—

Figure 1 is a front view of the shutter constructed in accordance with the present invention;

Fig. 2 shows the front plate of the shutter casing removed with the parts in normal position adjusted for obtaining instantaneous exposure with a maximum retarding action;

Fig. 3 is a view showing the connection between the operating devices and the master or motor member of the shutter, prior to the setting of the shutter, parts of the retarding mechanism also being shown;

Fig. 4 is a view similar to Fig. 3, showing the master or motor member at the time of the release;

Fig. 5 is a view similar to Fig. 2, showing the shutter adjusted for instantaneous exposure without any retarding action;

Fig. 6 is a view similar to Fig. 5, showing the shutter in set position adjusted for instantaneous exposure of maximum duration;

Fig. 7 is a view of the shutter adjusted for time exposure, the shutter blades being in open position;

Fig. 8 is a view of the shutter adjusted for bulb exposure, the shutter blades being in open position;

Fig. 9 is a detail view of the setting lever;

Fig. 10 is a detail view of a portion of the actuating or operating lever;

Fig. 11 is a detail view of one of the levers of the retarding mechanism;

Fig. 12 is a detail view of the lever which coöperates with the time and bulb detent and is interposed between said detent and the motor member; and Fig. 13 is a detail view of the time and bulb detent.

Referring first to Fig. 3, 1 indicates a master or motor member preferably pivoted within a casing A at 2 and connected by a latch 3 with a projection 4 on a shutter ring, not shown, to operate the shutter blades in a manner substantially the same as that shown in our prior Patent #1,122,950, dated Dec. 29, 1914. This master member has a shoulder 5 adapted to be engaged by a nose 6 on the detent 7 that is pivoted at 8 and has an arm 9 for engagement by a shoulder 10 on an actuating or operating member 11, the latter being pivoted at 12. A spring 13 acts on the detent 7 to move the latter to detaining position, while a spring 14 acts on the actuating lever 11 to move said lever in a direction opposite to that which it is moved by a cable release (not shown) or the finger piece lever 15, the cable release engaging a lug 16, while the finger piece lever engages a lug 17. The finger piece lever extends to the exterior of the casing A and is pivoted at 18 (see Fig. 2). A setting lever 19 is employed for the master member and is mounted to turn on the pivot 2 on the exterior of the casing of the shutter, being connected with the master member 1 by a projection 20 on the master member extending into a slot 21 in the setting lever.

A time and bulb detent for time and bulb exposures is provided and is shown in detail in Fig. 13. It comprises preferably a member 22 pivoted at 23 and having a stop shoulder 24 thereon adapted to be moved into and out of the path of a shoulder 25 on a lever 26, the latter being shown in detail in Fig. 12 and being pivoted at 27 so that the shoulder 28 thereon may be engaged by a projection or shoulder 29 on the master member, whereby the latter is held against movement when the lever 26 is held, to hold the shutter blades in open position, there being a slight movement of the master member before the shoulder 29 thereon engages the shoulder 28 on the intermediate lever 26.

When the shutter is in normal position, the shoulder 25 lies in advance of the face or shoulder 24ª, and holds the detent against movement under the action of its spring.

The time and bulb detent 22 may be controlled by the actuating or operating member 11, and to this end has a hooked arm 30 and a latch 31 pivoted thereto at 32 and held in one position by a spring 33, which also tends to move the detent 22 to carry the shoulder 24 in the path of the lever 26, a lateral lug 34 on the operating member 11 coöperating with the hooked end 30 in two positions, one to prevent the shoulder 24 of the time and bulb detent moving in the path of the projection 25 on the lever 26 (as shown in Fig. 6), and the other to hold the projection 24 in the path of the shoulder 25 for time exposure, as shown in Fig. 7. The free end of the latch 31 is also adapted to be engaged by the projection 34 when the shutter is open on time exposure, as shown in Fig. 7, so that, upon the second manipulation or operation of the actuating or operating member 11, the time and bulb detent 22 may be shifted to carry the shoulder 24 out of the path of the shoulder 25, and the lever 26 may move under the action of the master or motor member 1 to permit the latter to close the shutter blades.

To the end that the latch 31 will not be engaged by the projection 34 when the actuating member 11 is operated in the first instance to release the master member, an extension 35 is provided on the lever 26 to engage a shoulder 36 on the latch 31 to swing the latch to the position shown in Fig. 6, when the master or motor member 1 is shifted to setting position with the intermediate member or lever 26.

In order that the time and bulb detent may be controlled to produce time, bulb, or instantaneous exposures, a controlling member is provided, preferably in the form of a cam disk 37, mounted on a post 38 and controlled from the exterior of the casing by a dial disk 39, above which an indicator or pointer 40 is mounted. This cam disk has an irregular periphery for engagement with a projection 41 on the time and bulb detent 22. In one position, as shown in Fig. 7, the cam disk is adjusted so that it permits the shoulder 24 to move in the path of the shoulder 25, under the action of the spring 33, when the lever 26 is shifted to setting position. Upon the first actuation of the operating member 11, the lug 6 is shifted out of engagement with the shoulder 5, so that the master member 1 opens the shutter, as shown in Fig. 7, the projection 29 on the master member engaging the shoulder 28 on the intermediate member or lever 26, so that the movement of the master member 1 is stopped, due to the fact that the intermediate lever 26 has its shoulder 25 engaging the shoulder 24 on the time and bulb detent 22. On the next actuation of the operating or actuating lever 11, the projection 34 engages the free end of the latch 31 and shifts the time and bulb detent 22 to carry the shoulder 24 out of the path of the shoulder 25 on the intermediate lever 26, thereby permitting the master member 1 to continue its movement in order to close the shutter blades.

For instantaneous exposures, the controlling member 37 is adjusted to the position shown in Fig. 5, where it holds the shoulder 24 on the bulb and time detent entirely out of the path of the projection 25 on the intermediate lever 26. In fact, the intermediate lever 26 is also held from following the master lever, in a manner to be described, so that, with this adjustment, upon the actuation of the lever or operating member 11, the lug 6 releases the master member 1 which then proceeds to open and then close the shutter blades without any restraint to its movement.

On bulb exposures, the parts are adjusted as shown in Fig. 8, where the shoulder 24 on the detaining member is permitted to enter into the path of the shoulder 25 of the intermediate member 26, but, when pressure is relieved from the actuating member or lever 11, the projection 34 contacts with the end 30 and shifts the nose or shoulder 24 out of the path of the shoulder 25 so that the shutter is held open only so long as pressure is maintained upon the actuating member or lever.

The retarding mechanism embodies preferably two retarding devices. The first of these retarding devices is connected to the intermediate lever 26 which for this purpose has an extension 42 formed with a slot 43 in which a projection 44 on a gear wheel 45 is arranged, said gear wheel meshing with a pinion 46 on a fly-wheel 47. It is apparent that this train of wheels will impose a resistance to the movement of the intermediate lever 26, which, being in the path of the master member 1, will tend to retard the movement of said master member. The second retarding device embodies a lever 48 pivoted at 49 and adapted to be engaged by a shoulder or projection 50 on the intermediate lever 26. The lever 48 has an enlarged end 51 adapted for engagement with a lateral projection 52 on an oscillatory or segmental gear 53, which connects by a train of gearing 54 with an escapement gear 55 with which coöperates a pivoted anchor 56. The coöperating faces on the escapement wheel and the pivoted anchor are so formed that the escapement wheel may turn in either direction. This is desirable as it makes unnecessary the throwing out of the anchor in order that the escapement wheel may make a return movement, this return movement being effected in this instance by a spring 57 which acts on the oscillatory member 53 in order to turn said member to its normal position.

The control of the two retarding devices is preferably effected by a controlling lever 58, which is pivoted at 59 and has one end coöperating with the controlling disk 37, while the other end has a portion 61 for coöperating with a lateral projection 62 on the retarding lever 48. A surface 63 is also provided on the controlling lever 58 for the purpose of coöperating with the lateral projection 64 on a lever 65 which is pivoted at 66 and has its free end coöperating with a lateral projection 67 on the intermediate lever 26.

For obtaining an instantaneous exposure of a maximum duration, the controlling body 37 is adjusted to the position shown in Figs. 2 and 6, Fig. 2 showing the normal position of the parts, and Fig. 6 showing the position of the parts after the master member 1 has been moved to set position. On this adjustment the controlling member 58 lies in a position where it does not interfere with either of the retarding devices, so that both are imposed upon the master member through the intermediate lever 26, the one with the fly wheel 47 being directly connected with the lever or member 26, while the one with the escapement is connected with the lever 26 through the projection 50 and the retarder lever 48.

When the shutter is adjusted for instantaneous exposure, without any retarding action, the parts are positioned as shown in Fig. 5, the controlling disk or body 37 shifting the controlling lever 58 to engage the lever 65 and the lever 48, the lever 65 holding the intermediate member or lever 26 in its normal position so that it cannot follow the master or motor member 1 under the action of the spring 69 when the shutter is set, and the lever 48 being held so that it cannot move under the action of the spring 57. It is possible to so adjust the controlling body or disk 37 that any degree of retardation may be effected by the escapement retarding device, or the latter may be cut out completely and the retarding effected solely by the fly wheel retarding device and the lever 26, the amount of retardation of this last named retarding device being also variable.

A photographic shutter according to this invention has a retarding mechanism which may be adjusted to obtain substantially any speed of exposure between two limits. The escapement may move in either direction without disconnecting the anchor from the escapement wheel, so that fewer parts are required in the construction of the shutter.

What we claim as our invention and desire to secure by Letters Patent is:—

1. In a photographic shutter, the combination with a master member, of an intermediate member arranged in the path of the master member, a fly wheel, gearing connected to the fly wheel and having a pin and slot connection with the intermediate member, detaining means for the master member for holding the latter in set position, detaining means for the intermediate member to stop the master member to hold the shutter open, and a controlling device for holding the intermediate member in inoperative position so that the master member may open and close the shutter for instantaneous exposure.

2. In a photographic shutter, the combination with a master member, of an intermediate member, detaining means for the master member, a detent for the intermediate member having a latch pivoted thereon, and adapted to be engaged by the intermediate member to be shifted to inoperative position by said intermediate member, a spring acting on said detent to move it in the path of the intermediate member, and an actuating member controlling the detaining means of the master member, engageable with the detent of the intermediate member to hold the latter against the action of its spring until the master member is released, and also engageable with the latch on the detent to shift the latter out of the path of the intermediate member.

RUDOLPH KLEIN.
THEODOR M. BRUECK.